(12) United States Patent
Hitchcock et al.

(10) Patent No.: US 8,801,848 B2
(45) Date of Patent: Aug. 12, 2014

(54) ADHESIVE

(75) Inventors: Richard R. Hitchcock, Letts, IA (US); Eric R. Mehnert, Muscatine, IA (US)

(73) Assignee: Grain Processing Corporation, Muscatine, IA (US)

( * ) Notice: Subject to any disclaimer, the term of this patent is extended or adjusted under 35 U.S.C. 154(b) by 162 days.

(21) Appl. No.: 13/100,002

(22) Filed: May 3, 2011

(65) Prior Publication Data

US 2011/0271871 A1 Nov. 10, 2011

Related U.S. Application Data

(60) Provisional application No. 61/333,017, filed on May 10, 2010.

(51) Int. Cl.
*C09J 103/02* (2006.01)

(52) U.S. Cl.
USPC ...................................................... 106/215.5

(58) Field of Classification Search
None
See application file for complete search history.

(56) References Cited

U.S. PATENT DOCUMENTS

| | | | |
|---|---|---|---|
| 3,663,369 A | 5/1972 | Morehouse et al. | |
| 4,008,116 A | 2/1977 | Sebel | |
| 4,575,525 A | 3/1986 | Wacome et al. | |
| 4,643,894 A | 2/1987 | Porter et al. | |
| 4,678,824 A | 7/1987 | Lauria | |
| 4,725,441 A | 2/1988 | Porter et al. | |
| 4,828,841 A | 5/1989 | Porter et al. | |
| 4,921,795 A | 5/1990 | Bozich, Jr. | |
| 5,529,619 A * | 6/1996 | Warmerdam et al. | 106/145.1 |
| 5,688,845 A | 11/1997 | Eden et al. | |
| 5,827,553 A | 10/1998 | Dimitroglou et al. | |
| 5,932,639 A | 8/1999 | Eden et al. | |
| 6,379,447 B1 | 4/2002 | Eden et al. | |
| 6,846,502 B1 * | 1/2005 | Billmers et al. | 426/289 |
| 7,070,822 B1 * | 7/2006 | Shi et al. | 426/289 |
| 2002/0187220 A1 * | 12/2002 | Luhadiya | 426/89 |

OTHER PUBLICATIONS

Packaging enduser: starch and dextrin based adhesives 2005 http://www.adhesivesmag.com/articles/packaging-enduser-starch-and-dextrin-based-adhesives.*

* cited by examiner

*Primary Examiner* — Melvin C Mayes
*Assistant Examiner* — Stefanie Cohen
(74) *Attorney, Agent, or Firm* — Fitch, Even, Tabin & Flannery LLP

(57) ABSTRACT

Disclosed is an adhesive that may include two or more starches or starch derivatives with different molecular weights. In many embodiments, the adhesive includes (1) unmodified or slightly thinned starch, (2) maltodextrin or syrup solid, and (3) a hydroxypropyl starch. In most embodiments, the adhesive includes a plasticizer. The adhesive may be prepared by blending the starch and starch derivatives, and cooking the blended slurry, preferably under acidic conditions. The adhesive may be employed for various purposes including as an adhesive for a multi-wall bag.

17 Claims, No Drawings

ADHESIVE

RELATED APPLICATION

This application claims benefit of U.S. Provisional Application No. 61/333,017, filed May 10, 2010, which is incorporated herein by reference in its entirety.

TECHNICAL FIELD

In general, some embodiments of the invention are in the field of adhesives and related methods, including methods of preparing an adhesive and methods of using an adhesive. Certain embodiments of the invention are in the field of starch derivatives, including adhesives prepared from starch derivatives. In some embodiments, the invention provides a lamination adhesive for packaging products such as multi-wall bags.

BACKGROUND

Starch and starch-derived dextrins commonly have been used for many years as components in adhesives. Typical applications of starch and dextrin adhesives include corrugated box board, envelopes, bottle labeling, paper bag seams, stamps, wallpaper, and laminates. Starch and dextrins have many advantageous attributes for use as adhesives, such as their typical low cost, the abundance of starch, insolubility of starch and dextrins in fats and oils, and lack of toxicity.

In adhesive applications, starches and dextrins provide a good adhesive base, but by themselves are not often used as adhesives in certain applications. For many industrial uses, starches and dextrins are combined with other additives such as polyvinyl acetate, or polyvinyl alcohol. These additives are not only often times derived from petroleum sources, but can significantly raise the cost associated with producing the adhesive.

In particular, in lamination adhesives for multi-wall bags, it is desirable to have an adhesive that adheres well to polyethylene and to paper. There is a large market for multi-wall bags. Many such bags are shipped as a multi-wall laminar structure, the structure including paper and polyethylene, for instance, and sometimes including multiple layers. The individual layers within the multi-wall bag typically are adhered together with adhesive. In such applications, it is desirable for the adhesive to be sufficiently strong to achieve a cohesive bag that will be able to retain the intended contents and that will not delaminate upon filling, handling, and transport. In many embodiments, it is desirable that the adhesive have a "fiber tear" property, such that the adhesive is sufficiently strong to tear a paper or polyethylene substrate upon application of a tearing force.

In light of the wide levels of availability of starch products, starch-based lamination adhesives have been attempted. As starch is modified (typically with acid) to reduce the molecular weight, the solids level of a liquid starch adhesive can be increased. Starch based adhesives have been made in the 30% solids range using this method. Variations incorporate other modifications, including the use of propylated, ethylated, and oxidized starches. These adhesives work well for paper to paper applications, and they may also work in some limited paper to non-porous applications. However, they do not exhibit affinity to polyethylene or to other surfaces that are difficult to adhere. In addition, it is difficult to achieve a workable adhesive with a solids content greater than about 30%. Generally, higher solids contents are more desirable in adhesives, because the liquid component of the adhesive can warp or otherwise damage certain substrates, and a higher solids content generally correlates to a shorter drying time.

Starch derivatives have been used as adhesives. For instance, maltodextrin and syrup solids have been employed. Maltodextrin has an affinity for polyethylene. Additionally, maltodextrin has a low molecular weight relative to starch, thereby allowing for a relatively high solids content (around 65%) in an adhesive. Upon drying, however, maltodextrin becomes brittle. Additionally, maltodextrin has low cohesive strength relative to starch. Hydroxypropyl starch (such as P30L, a starch presently available from Grain Processing Corporation of Muscatine, Iowa) is an adhesive that adheres well to polypropylene, but, for reasons not well understood, does not adhere well to polyethylene.

SUMMARY

It has now been found that an adhesive can be prepared using a combination of starch and a starch derivative, such as a maltodextrin. In most embodiments, three different starch-based products are employed, these including (1) unmodified or slightly thinned starch, (2) maltodextrin or syrup solid, and (3) a modified starch, such as hydroxypropyl starch, or waxy starch. In some embodiments, the adhesive includes a plasticizer. The modified starch should be a film-forming starch that is resistant to retrogradation in the intended adhesive application.

In some embodiments, the adhesive is prepared by blending the starch and starch derivatives in a slurry, and cooking the slurry. Any suitable cooking apparatus may be employed, but a preferred apparatus is a jet-cooking apparatus. The slurry may be thinned with acid during or after cooking.

Thus, in some embodiments, the invention provides an adhesive, the adhesive comprising an unmodified or slightly thinned starch, a partially hydrolyzed starch derivative, the starch derivative being present in an amount effective to provide affinity to polyethylene, and a modified starch, the modified starch being present in an amount effective to inhibit retrogradation of the starch component of the adhesive. In some embodiments, the invention provides a process that comprises providing a mixture comprising an unmodified or slightly thinned starch, a partially hydrolyzed starch derivative, and a modified starch, and jet-cooking the mixture under conditions suitable to form an adhesive, the starch derivative being present in said mixture in an amount effective to provide affinity to polyethylene in said adhesive, the modified starch being present in said mixture in an amount effective to inhibit retrogradation of the starch component in said adhesive. The starting mixture may be jet-cooked under acidic conditions.

DETAILED DESCRIPTION

Generally, an adhesive may include two (or more) starches or starch derivatives with different molecular weights. In many embodiment, the adhesive includes (1) an unmodified or slightly thinned starch, (2) a partially hydrolyzed starch derivative, such as a maltodextrin or syrup solid, and (3) a hydroxypropyl or other modified starch or a waxy starch. In most embodiments, the adhesive includes a plasticizer. The starch and starch derivatives may be obtained from any suitable grain, such as corn, wheat, rice, potato, or the like. Preferred ranges for the various ingredients are set forth below Maltodextrin or syrup solid: 25-75%
Modified Starch: 1-15%
Unmodified Starch: 1-15%

Plasticizer: 1-30%
Water: 30-75%

Although it is not intended to limit the invention to a particular theory of operation, it is believed that each component of the adhesive performs certain functions or otherwise provides benefits. The unmodified starch is believed to impart cohesive strength, and also is less expensive in many cases than the modified starch. Any suitable unmodified starch may be employed. Corn starch is preferred, but any other suitable starch may be employed. The starch may be unmodified as supplied, or may be slightly acid thinned.

When a maltodextrin is employed, it may have any suitable dextrose equivalent value. Suitable maltodextrins are sold by Grain Processing Corporation under the product names MALTRIN@, M040, M050 M100, M150, and M180. Other starch derivatives, such as syrup solids or polydextroses, may be employed The maltodextrin or starch derivative is believed to provide an affinity for polyethylene, and also to enable the adhesive to have a higher solids content. Hydrogenated maltodextrins and other starch derivatives may be employed.

The propylated starch, or other suitable modified starch, is believed to provide cohesion and to assist in limiting retrogradation of the starch component of the adhesive. The modified starch may be derivatized to any suitable degree of substitution. The starch may be derivatized with any suitable material. Alternatively, or in addition thereto, a waxy, high molecular weight starch may be employed.

The plasticizer is believed to impart flexibility. Any suitable plasticizer, such as glycerin, may be employed. Other suitable plasticizers include polyalkylene alcohols. In some embodiments, the plasticizer may be present in an amount ranging from about 5-30%.

These ingredients may be present in amounts effective for their respective purposes. The adhesive may include other materials, such as biocides, colorants, and so forth. If other ingredients are present, they may be present in any amounts suitable for their intended purpose.

The adhesive may be prepared by any suitable method, such as batch cooking or jet cooking the ingredients. The preferred method is via forming a slurry and jet-cooking the slurry. In many embodiments, acid is added to the slurry before cooking to bring the pH in the range from 2.8 to 4.0. Any suitable jet-cooking apparatus and conditions may be employed. Exemplary conditions are provided hereinbelow in the Examples.

An adhesive prepared in accordance with the preferred teachings herein has several desirable properties. The solids content can be made to be in excess of 25%, and in some embodiments in excess of 30%, and in some embodiments in excess of 35%, and in some embodiments in excess of 40%, and in some embodiments in excess of 45%, and in some embodiments in excess of 50%, and in some embodiments in excess of 55%, and in some embodiments in excess of 60%, and in some embodiments in excess of 65%. A solids content of 50-55% is preferred. The adhesive can have good affinity and adhesion to both polyethylene and polypropylene, as well as paper. The adhesive can be made to be flexible to facilitate handling. Also, the adhesive may be formulated to have some tack, such that if there is a momentary separation between the materials to be adhered together, the adhesive will not fail. The adhesive can be made to adhere well to glass as well as metallic material.

The following examples and comparative examples are provided for illustration.

Comparative Example 1

Ethylated Starch Adhesives

The following adhesive formulations were prepared with ethylated starch (GPC K96F). Each formulation was prepared with the below indicated components along with water to bring the total sample size to 800 g.

| Sample | Ethylated Starch in grams (44% solids slurry) | Ethylated Starch in grams (43% solids slurry) | BAN enzyme* | PVOH* (C203SF PVOH) | PVP* | Na borate* | HCl* |
|---|---|---|---|---|---|---|---|
| C1A | 352 | | 0.0426 | | | | |
| C1B | | 344 | 0.08 | 5 | 4 | 1 | |
| C1C | 352 | | | | | | 2.84 |

*% on a dry starch solids basis

C1A: Indicated amounts of ethylated starch and water were slurried in an atmospheric cook container. BAN enzyme (amylase enzyme), slurried with a minimum amount of water, was added. The slurry was cooked at 195° F. for 20 minutes and reactions were terminated with addition of 2 ml of hydrogen peroxide.
C1B: Indicated amounts of ethylated starch, polyvinyl alcohol (PVOH), polyvinyl pyrrolidone (PVP), sodium borate and water were slurried in an atmospheric cook container. BAN enzyme, slurried with a minimum amount of water, was added. The slurry was cooked at 180° F. for 60 minutes and reactions were terminated with addition of 2 ml of hydrogen peroxide.
C1C: Indicated amounts of ethylated starch, HCl and water were slurried in an atmospheric cook container along with antifoam (0.85% on a dry starch solids basis).
The slurry was cooked at 200° F. for 20 minutes and reactions were terminated with addition of sodium carbonate (1.56% on a dry starch solids basis).

Bonding Strength

Spot adhesion tests were used to determine effectiveness of the adhesive for paper/paper adhesion and polyethylene (PE)/paper adhesion. The test was conducted by placing one drop of glue on a 3×5 inch plastic card over a 0.5 inch diameter hole in the card and scraping away the excess. About 0.10 gram of adhesive was transferred to a paper underneath the card. Either polyethylene or a second sheet of paper was placed on the glue spot and an 8×8 inch steel weight of 593 grams was placed on the glue spot for 30 seconds. Samples were pulled apart after a period of time, generally 24 hours, and evaluated qualitatively. Materials that exhibited "good" or "excellent" results showed fiber tear properties, and were deemed suitable for commercial use.

| Sample | Description | Paper/Paper | PE/Paper |
|---|---|---|---|
| C1A | Ethylated starch | poor | poor |
| C1B | Ethylated starch/PVOH/PVP | fair | fair |
| C1C | Ethylated starch/acid | fair | poor |

Comparative Example 2

Ethylated and Propylated Starch Slurries and Adhesives

An ethylated starch slurry (slurry 2-1) was prepared by blending GPC K98F with water to provide a 42% solids slurry. The pH was adjusted to 2.5 with 6N $H_2SO_4$. The slurry was jet cooked at 300° F. through a 5 minute loop.

A propylated starch slurry (slurry 2-2) was prepared by blending GPC B790 with water to provide a 40% solids slurry. The pH was adjusted to 2.51 with 6N $H_2SO_4$. The slurry was jet cooked at 300° F. through a 5 minute loop.

The following blends were prepared and tested according to the procedure described in Example 1.

| Sample | Description | Paper/Paper | PE/Paper |
|---|---|---|---|
| C2A | 33% slurry 2-1<br>33% slurry 2-2<br>33% latex<br>1% borate | good/excellent | fair |
| C2B | 25% slurry 2-1<br>25% slurry 2-2<br>25% latex<br>25% Sample 4A (Ex. 4) | excellent | poor |
| C2C | 30% slurry 2-1<br>30% slurry 2-2<br>40% latex | good | poor |
| C2D | 20% slurry 2-1<br>20% slurry 2-2<br>40% latex<br>20% Sample 4A (Ex. 4) | good/excellent | poor |

Example 1

Propylated Starch Adhesives

A maltodextrin slurry was prepared by blending GPC MALTRIN M180 with water to form a slurry containing 68% solids. Acid modified starch was prepared by blending GPC T300 with water to form a slurry containing 12% solids. A propylated starch, GPC P30L, was supplied. A sample of combined cooked ingredients was prepared by adding the above-identified components in the following amounts:

|  | Amount (g) |
|---|---|
| P30L 45% | 360 |
| M180 (35% slurry) | 280 |
| T300 (20% slurry) | 160 |

This sample had good/excellent paper to paper adhesion and fair/good PE/paper adhesion.

Comparative Example 3

Ethylated Starch/Cationic Starch Blends

The following adhesive formulations where prepared with ethylated starch (GPC K96F). Each formulation was prepared with the below indicated components along with water to bring the total sample size to 800 g.

| Sample | Ethylated Starch in grams (44% solids slurry) | Ethylated Starch in grams (42% solids slurry) | BAN enzyme* | PVOH* (C203 SF PVOH) | PVP* | Na borate |
|---|---|---|---|---|---|---|
| C3A | 352 | | 0.0492 | | | |
| C3B | | 336 | 0.08 | 5 | 4 | 1 |

C3A: The indicated amounts of ethylated starch and water were slurried in an atmospheric cook container. BAN enzyme slurried with a minimum amount of water was added. The slurry was cooked at 195° F. for 20 minutes and reactions were terminated with addition of 2 ml of hydrogen peroxide. The cooked ethylated starch slurry (250 g) was blended with 250 grams of cationic starch paste (GPC L340).
C3B: The indicated amounts of ethylated starch and water were slurried in an atmospheric cook container. BAN enzyme slurried with a minimum amount of water was added. The slurry was cooked at 195° F. for 30 minutes and reactions were terminated with addition of 2 ml of hydrogen peroxide. The cooked ethylated starch slurry (312 g) was blended with 102 grams of cationic starch paste (GPC L340).

Bonding strength was tested as described in Example 1 and was as follows.

| Sample | Description | Paper/Paper | PE/Paper | Comments |
|---|---|---|---|---|
| C3A | Ethylated/cationic starch | Good | poor | unstable |
| C3B | Ethylated/cationic starch/PVOH/PVP/acid | good | fair | unstable |

Comparative Example 4

Ethylated Starch/Latex Blends

Ethylated starch/latex blends were prepared as follows. Bonding strength was tested as described in Example 1. Dispersant (0.1% Dipex N-40, based on starch slurry weight) was added to each sample and all components for each sample were blended on a high shear mixer for 4 minutes at 22 rpm.

| Sample | Formula 1879-9-2 (grams) | Latex* | Paper/Paper | PE/Paper |
|---|---|---|---|---|
| C4A | 320 | 1 | good | poor |
| C4B | 315 | 2.5 | good | poor |
| C4C | 330 | 5 | excellent | poor |

*Latex was DOW CP620NA (carboxylated styrene-butadiene latex); amounts are % based on starch slurry weight.

Comparative Example 5 and Example 1A

Starch Blends

The following starch blends were prepared. Bonding strength was tested as described in Example 1.

C5D and C5E:
Indicated amounts of propylated starch (GPC B790), maltodextrin (M180), waxy starch and water were slurried in an atmospheric cook container. The slurry was cooked at 212° F. for 30 minutes.

C5F:
Indicated amounts of propylated starch (GPC B790), maltodextrin (M180), waxy starch and water were slurried in an atmospheric cook container. The slurry was cooked at 212° F. for 30 minutes. The indicated amount of glycerin was added after cooling at 5% on a collected weight basis.

C5G:
Indicated amounts of OS MALTRIN, unmodified starch (GPC B200), propylated starch (GPC B990), and water were slurried in an atmospheric cook container. The slurry was cooked at 212° F. for 30 minutes.

C5H:

The indicated amount of waxy starch was jet cooked at 300° F. through a 5 minute loop. The sample was cooled to 140° F. and indicated amounts of Quat and NaOH were added. The sample was stirred for 3 hours and the pH was reduced to 4.0 with addition of HCl. Biocides were added at 0.15% based on the total weight of the sample.

C5I:

The indicated amount of waxy starch was jet cooked at 300° F. through a 5 minute loop.

C5J:

Indicated amounts of maltodextrin (M180), OS MALTRIN, waxy starch, propylated starch (GPC B990), and water were slurried in an atmospheric cook container. The slurry was cooked at 212° F. for 30 minutes.

C5K:

The indicated amount of maltodextrin (M180) was slurried with warm water. An equal amount of C5I was added to provide a 50/50 weight mixture.

C5L:

The indicated amounts of propylated starch and latex (Dow CP620NA) were added separately and stirred together.

1A:

Indicated amounts of maltodextrin (M180), propylated starch (GPC B790), waxy starch and water were slurried in an atmospheric cook container. The slurry was cooked at 212° F. for 30 minutes. The indicated amount of glycerin was added after cooling at 5% on a total weight basis.

| Sample | Description | Paper/Paper | PE/Paper |
|---|---|---|---|
| C5D | 39.4% M180<br>13.3% B790<br>1.42% Waxy<br>45.9% water | Fair | Fair |
| C5E | 26.3% M180<br>22.0% B790<br>1.2% Waxy<br>50.5% water | Good/<br>Excellent | Fair |
| C5F | 25.0% M180<br>21.0% B790<br>1.1% Waxy<br>4.8% glycerin<br>48.1% water | Excellent | Fair |
| C5G | 39.3% OS<br>2.3% B200<br>3.0% B990<br>55.4% water | Excellent | Fair |
| C5H | 30.0% Waxy<br>2.3% Quat<br>2.4% NaOH<br>65.3% water | Good | Poor |
| C5I | 31.5% Waxy<br>68.5% water | Excellent | Poor |
| C5J | 21% M180<br>16.8% OS MALTRIN<br>2.7% Waxy<br>3.0% B990<br>56.5% water | Excellent | Poor |
| C5K | 31.5% M180<br>9.9% waxy<br>58.6% water | Good | Poor |
| C5L | 50% P30L (30% solids)<br>50% latex (@ 50% solids) | Good | Poor |
| 1A | 37.5% M180<br>11.2% B790<br>1.9% Waxy<br>4.8% glycerin<br>44.6% water | Good | Good |
| C5M | cationic starch paste L340 | Good | Fair |
| C5N | cationic starch paste L360 | Excellent | Poor |
| C5O | cationic starch paste L435 | Good | Poor |

Comparative Example 5A

Maltodextrin/Acid Modified Starch Blends

Maltodextrin/acid modified starch blends having the following compositions were prepared by dry-blending maltodextrin and starch and adding water.

| Sample | maltodextrin slurry g (%) | C150 acid modified starch slurry g (%) | C165 acid modified starch slurry g (%) | C140 acid modified starch slurry g (%) | Water g (%) |
|---|---|---|---|---|---|
| C5P | 244.8 (30.6) | | 72 (9) | 40 (5) | 443.2 (55.4) |

All ingredients for each sample were mixed together and cooked in an atmospheric cooker at 200° F. for 20 minutes. Bonding strength was tested as described in Example 1 and was as follows.

| Sample | Description | Paper/Paper | PE/Paper | Comments |
|---|---|---|---|---|
| C5P | Maltodextrin/C165/C140 | good | Poor | starch not cooked |

"Starch not cooked" signified that the starch remained granular and the maltodextrin appeared to absorb water.

Comparative Example 6

Maltodextrin/Acid Modified Starch/Propylated Starch Blends

The indicated amounts of maltodextrin (M180), propylated starch (B990), acid modified starch (C140), and water were mixed together and cooked in an atmospheric cooker at 212° F. for 30 minutes. Bonding strength was tested as described above and was as follows.

| Sample | Description | Paper/Paper | PE/Paper | Comments |
|---|---|---|---|---|
| C6A | 34% M180<br>4.5% B990<br>4.2% C140<br>57.3% water | fair | poor | starch not cooked |

-continued

| Sample | Description | Paper/Paper | PE/Paper | Comments |
|---|---|---|---|---|
| C6B | 35.7% M180<br>3.0% B990<br>4.5% C140<br>56.8% water | fair | poor | starch not cooked |

Example 2 and Comparative Example 6B

Maltodextrin/Unmodified Starch/Propylated Starch Blends

Maltodextrin/unmodified starch/propylated starch blends were prepared as follows.

| Sample | maltodextrin slurry g (%) | unmodified starch slurry g (%) | propylated starch slurry g (%) | water g (%) |
|---|---|---|---|---|
| 2A | 294 (36.75) | 18 (2.25) | 24 (3) | 464 (58) |
| C6B | 268.8 (33.6) | 25.6 (3.2) | 24 (3) | 481.6 (60) |

All ingredients for each sample were mixed together and cooked in an atmospheric cooker at 212° F. for 30 minutes with no acid modification. Bonding strength was tested as described in Example 1 and was as follows.

| Sample | Description | Paper/Paper | PE/Paper | Comments |
|---|---|---|---|---|
| 2A | Maltodextrin/<br>unmodified starch/<br>propylated starch | Fair | good/<br>excellent | Consistency not smooth |

-continued

| Sample | Description | Paper/Paper | PE/Paper | Comments |
|---|---|---|---|---|
| C6B | Maltodextrin/<br>unmodified starch/<br>propylated starch | Fair | Fair | Gelled |
| 2B | 2A + 7.5% glycerin | excellent | good/<br>excellent | Consistency not smooth |
| 2C | 2B + 5% glycerin | good/<br>excellent | good/<br>excellent | Consistency not smooth |
| 2D | 2C + 2.5% glycerin | good/<br>excellent | good/<br>excellent | Consistency not smooth |

Comparative Example 7

Maltodextrin/Ethylated Starch and Maltodextrin/Ethylated Starch/Unmodified Starch Blends Maltodextrin/unmodified starch/ethylated starch blends were prepared as follows.

| Sample | maltodextrin slurry g (%) | ethylated starch slurry g (%) | unmodified starch slurry g (%) | water g (%) |
|---|---|---|---|---|
| C7A | 280 (35) | 120 (15) | | 400 (50) |
| C7B | 294 (36.75) | 24 (3) | 18 (2.25) | 464 (58) |
| C7C | 168 (21) | 126 (15.8) | 22.4 (2.8) | 483.6 (60.4) |

All ingredients for each sample were mixed together and cooked in an atmospheric cooker at 212° F. for 30 minutes. Bonding strength was tested as described in Example 1 and was as follows.

| Sample | Description | Paper/Paper | PE/Paper | Comments |
|---|---|---|---|---|
| C7A | Maltodextrin/ethylated starch | fair | poor | gelled |
| C7B | Maltodextrin/ethylated/unmodified starch | too thin | too thin | too thin |
| C7C | Maltodextrin/ethylated/unmodified starch | fair | poor | gelled |

Example 3 and Comparative Example 8

Maltodextrin/Propylated Starch/Unmodified Starch Blends and Maltodextrin/Propylated Starch/Ethylated Starch Blends Maltodextrin/unmodified starch/propylated starch blends and maltodextrin/propylated starch/ethylated starch blends were prepared as follows.

| Sample | Maltodextrin slurry g (%) | propylated starch slurry g (%) | ethylated starch slurry g (%) | unmodified starch slurry g (%) | water g (%) | glycerin % |
|---|---|---|---|---|---|---|
| C8A | 280 (35) | 36 (4.5) | | 22.4 (2.8) | 461.6 (57.7) | |
| 3A | 294 (34.1) | 24 (2.8) | | 18 (2.1) | 464 (54) | 7 |
| 3B | 294 (35) | 24 (2.9) | | 18 (2.1) | 464 (55.2) | 4.8 |
| 3C | 294 (35.9) | 24 (2.9) | | 18 (2.2) | 464 (56.6) | 2.4 |
| C8B | 224 (28) | 24 (3) | 200 (25) | | 352 (44) | |

Glycerin was added after cooling of the sample. All ingredients for each sample were mixed together and cooked in an atmospheric cooker at 212° F. for 30 minutes. Bonding strength was tested as described in Example 1 and was as follows.

| Sample | Description | Paper/Paper | PE/Paper | Comments |
|---|---|---|---|---|
| C8A | Maltodextrin/propylated/<br>unmodified starch | fair | fair | gelled |
| 3A | Maltodextrin/propylated/<br>unmodified starch +<br>glycerin | excellent | excellent | Consistency not smooth |
| 3B | Maltodextrin/propylated/<br>unmodified starch +<br>glycerin | good/<br>excellent | good/<br>excellent | Consistency not smooth |

-continued

| Sample | Description | Paper/Paper | PE/Paper | Comments |
|---|---|---|---|---|
| 3C | Maltodextrin/propylated/ unmodified starch + glycerin | good/ excellent | good/ excellent | Consistency not smooth |
| C8B | Maltodextrin/propylated/ ethylated starch | gelled | gelled | gelled |

Example 4 and Comparative Example 9

Maltodextrin/Propylated Starch/Unmodified Starch Blends Made with Jet Cooking

Maltodextrin/unmodified starch/propylated starch blends were prepared as follows.

| Sample | maltodextrin slurry g (%) | propylated starch slurry g (%) | unmodified starch slurry g (%) | water g (%) | glycerin % | pH after mixing ingredients | Final pH |
|---|---|---|---|---|---|---|---|
| 4A | 4410 (34.3) | 456 (3.5) | 450 (3.5) | 6684 (52) | 6.6 | | |
| 4B | 5040 (42) | 600 (5) | 585 (4.9) | 5775 (48.1) | | 4.0 | |
| 4C | 5355 (44.6) | 648 (5.4) | 630 (5.3) | 5367 (44.7) | | 3.82 | |
| 4D | 5670 (44) | 684 (5.2) | 675 (5.2) | 4971 (38.5) | 7 | 3.35 | 5.35 |
| 4E | 5670 (44) | 684 (5.20) | 675 (5.3) | 4971 (38.5) | 7.5 | 3.15 | 6.7 |
| 4F | 5985 (46.4) | 624 (4.8) | 585 (4.5) | 4806 (37.3) | 7 | 3.15 | 6.7 |

Additional ingredients were added in some cases, as set forth in the table below. Glycerin was added after cooling of sample. The pH was adjusted to the indicated pH level after mixing ingredient together before jet-cooking. Final pH was adjusted as indicated after biocide was added using 50% NaOH.

All ingredients were mixed together and jet cooked at 300° F. through a 5 minute loop. Bonding strength was tested as described in Example 1 and was as follows.

| Sample | Description | Paper/Paper | PE/Paper | Comments |
|---|---|---|---|---|
| 4A | Maltodextrin/propylated/ unmodified starch + glycerin | excellent | excellent | slow dry time |
| C9A | 50% 4A 50% latex | excellent | poor | |
| 4B | Maltodextrin/propylated/ unmodified starch | good | good | gelled |
| 4C | Maltodextrin/propylated/ unmodified starch | fair/good | good | gelled |
| 4D | Maltodextrin/propylated/ unmodified starch + glycerin | excellent | fair/good | gelled |
| C9B | 75% 4D 5% glycerin 20% waxy | excellent | fair | |
| 4E | Maltodextrin/propylated/ unmodified starch + glycerin | excellent | fair/good | gelled |

-continued

| Sample | Description | Paper/Paper | PE/Paper | Comments |
|---|---|---|---|---|
| 4E1 | 4E with 0.5% cobalt acetate and 7% glycerin | excellent | excellent | gelled |
| 4E2 | 4E with 7% glycerin | good/ excellent | good/ excellent | gelled |
| 4E3 | 4E with 3.5% sorbitol | good/ excellent | fair/good | gelled |
| 4E4 | 4E with 8% glycerin | excellent | excellent | gelled |
| 4F | Maltodextrin/propylated/ unmodified starch + glycerin | good/ excellent | good | gelled |

-continued

| Sample | Description | Paper/Paper | PE/Paper | Comments |
|---|---|---|---|---|
| 4F1 | 4F with 8% glycerin | good/ excellent | good | gelled |
| 4F2 | 4F with 10% glycerin | good/ excellent | good | gelled |
| 4F3 | 4F with 12% glycerin | good/ excellent | good | gelled |
| 4F4 | 4F with 15% glycerin | good/ excellent | excellent | gelled |

In Example 4E1, cobalt acetate was employed as a drier.

Example 5 and Comparative Example 11

Maltodextrin/Propylated Starch/Unmodified Starch Blends Made with Jet Cooking and Biocides Maltodextrin/unmodified starch/propylated starch blends with biocides were prepared as follows.

| Sample | maltodextrin slurry g (%) | propylated starch slurry g (%) | unmodified starch slurry g (%) | water g (%) | glycerin % | pH after mixing ingredients | Final pH |
|---|---|---|---|---|---|---|---|
| 5A | 12587.5 (37.3) | 1300 (3.8) | 984.375 (2.9) | 10128 (40) | 16 | 3.1 | 4.0 |
| 5B | 11660 (32.9) | 1250 (3.5) | 937.5 (2.6) | 11152.5 (45) | 16 | 3.2 | 4.0 |
| 5C | 10335 (28.2) | 1200 (2.4) | 890.625 (2.4) | 12574.3 (50) | 16.1 | 3.4 | 4.0 |

Glycerin was added after cooling of sample. The pH was adjusted to the indicated pH level after mixing ingredient together. Final pH was adjusted as indicated using concentrated $H_2SO_4$.

All ingredients were mixed together and jet cooked at 310° F. through a 5 minute loop.

Bonding strength was tested as described in Example 1 and was as follows.

| Sample | Description | Paper/Paper | PE/Paper |
| --- | --- | --- | --- |
| 5A | Maltodextrin/propylated/ unmodified starch | not tested | not tested |
| 5B | Maltodextrin/propylated/ unmodified starch | excellent | excellent |
| 5B1 | Maltodextrin/propylated/ unmodified starch - pH 3.15 | excellent | good/ excellent |
| 5C | Maltodextrin/propylated/ unmodified starch | excellent | excellent |
| C11 | Maltodextrin/propylated/ unmodified starch - pH 3.3 | excellent | fair/poor |
| 5A2 | 52.5% Maltodextrin/propylated unmodified starch pH 2.95 | excellent | good/ excellent |

Some of the foregoing systems were evaluated for tack property. In this evaluation, the bonding strength test set forth above in comparative Example 1 was employed, except that samples were pulled apart after the indicated time and the amount of tack was evaluated.

| SAMPLE | TIME(Minutes) | RESULT |
| --- | --- | --- |
| PVA | 2 | Slight Tack |
|  | 5 | Tack |
|  | 10 | 50% Wet Fiber Tear |
|  | 20 | 100% Fiber Tear |
| Latex (Dow RAP717NA) | 2 | Tack |
|  | 5 | 10% Fiber Tear, Wet |
|  | 10 | 30% Fiber Tear, Wet |
|  | 20 | 75% Fiber Tear |
| P30L | 2 | Very Slight Tack |
|  | 5 | Tack |
|  | 10 | Wet Fiber Tear <10% |
|  | 20 | 50% Wet Fiber Tear |
| 4A (No Glycerin) | 2 | Nothing |
|  | 5 | Slight Tack |
|  | 10 | Tack, 5% Fiber Tear, Wet |
|  | 20 | Strong Tack |
| 4A | 2 | Nothing |
|  | 5 | Very Slight Tack |
|  | 10 | Slight Tack |
|  | 20 | Tack |
| 4A + .1% Manganese Acetate | 2 | Nothing |
|  | 5 | Very Slight Tack |
|  | 10 | Slight Tack |
|  | 20 | Tack |
| 4A + .3% Manganese Acetate | 2 | Nothing |
|  | 5 | Slight Tack |
|  | 10 | Tack |
|  | 20 | Strong Tack |
| 4A + .5% Manganese Acetate | 2 | Nothing |
|  | 5 | Slight Tack |
|  | 10 | Tack |
|  | 20 | Strong Tack |
| 4A + 3% Manganese Acetate | 2 | Nothing |
|  | 5 | Slight Tack |
|  | 10 | Tack |
|  | 20 | Strong Tack |
| 4A + 3% BACOTE | 2 | Nothing |
|  | 5 | Very Slight Tack |
|  | 10 | Slight Tack |
| 4A + .25% TRITON | 2 | Nothing |
|  | 5 | Slight Tack |
|  | 10 | Tack |
|  | 20 | Strong Tack |

Manganese acetate is a drier. BACOTE is a cross-linking agent that includes ammonium zirconium carbonate. TRITON is a nonionic surfactant.

It is seen that an adhesive that has good polyethylene-to-paper binding may be prepared. The adhesive may be made to have a good tack property. In many embodiments, the adhesive is suitable as a lamination adhesive. The adhesive may be used in other applications; for instance, it is contemplated that the adhesive may be used as a seam adhesive.

Uses of singular terms such as "a," "an," are intended to cover both the singular and the plural, unless otherwise indicated herein or clearly contradicted by context. The terms "comprising," "having," "including," and "containing" are to be construed as open-ended terms. All references, including publications, patent applications, and patents, cited herein are hereby incorporated by reference. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

The invention claimed is:

1. An adhesive comprising an unmodified or slightly thinned starch, a partially hydrolyzed starch derivative, the starch derivative being present in an amount effective to provide affinity to polyethylene, and a starch constituent selected from the group consisting of a modified starch, a waxy starch, and mixtures thereof and being present in an amount effective to inhibit retrogradation of the unmodified or slightly thinned starch of the adhesive wherein the unmodified or slightly thinned starch is present in a range of about 1-15 wt %, the partially hydrolyzed starch derivative is present in a range of about 25-75 wt % and the starch constituent is present in a range of about 1-15 wt. %.

2. The adhesive of claim 1 having a solids content greater than 30%.

3. The adhesive of claim 1 having a solids content greater than 50%.

4. The adhesive of claim 1 wherein the partially hydrolyzed starch derivative is maltodextrin.

5. The adhesive of claim 1 further comprising a plasticizer.

6. The adhesive of claim 5 wherein the plasticizer is glycerin.

7. An adhesive comprising:
an unmodified or slightly thinned starch;
maltodextrin, the maltodextrin being present in an amount effective to provide affinity to polyethylene;
a starch constituent selected from the group consisting of a modified starch, a waxy starch, and mixtures thereof and being present in an amount effective to inhibit retrogradation of the unmodified or slightly thinned starch of the adhesive; and
a plasticizer,
wherein the adhesive is configured to adhere to at least polyethylene and paper,
wherein the unmodified or slightly thinned starch is present in a range of about 1-15 wt. %, the maltodextrin is present in a range of about 25-75 wt. %, the starch constituent is present in a range of about 1-15 wt. % and the plasticizer is present in a range of about 1-30 wt. %.

8. The adhesive of claim 7 having a solids content greater than 30%.

9. The adhesive of claim 7 having a solids content of greater than 50%.

10. The adhesive of claim 7 wherein the plasticizer is glycerin.

11. A process comprising:
providing a mixture comprising an unmodified or slightly thinned starch, a partially hydrolyzed starch derivative, and a starch constituent selected from the group consisting of modified starch and waxy starch and mixtures thereof, and
jet-cooking the mixture under conditions suitable to form an adhesive, the starch derivative being present in said mixture in an amount effective to provide affinity to polyethylene in said adhesive, the modified starch being present in said mixture in an amount effective to inhibit retrogradation of the unmodified or slightly thinned starch in said adhesive,
wherein the unmodified or slightly thinned starch is present in the mixture in a range of about 1-15 wt. %, the partially hydrolyzed starch derivative is present in the mixture in a range of about 25-75 wt. % and the starch constituent is present in the mixture in a range of about 1-15 wt. %.

12. The process of claim 11 wherein the adhesive has a solids content greater than 30%.

13. The process of claim 11 wherein the adhesive has a solids content greater than 50%.

14. The process of claim 11 wherein the partially hydrolyzed starch derivative is maltodextrin.

15. The process of claim 11 wherein the mixture further comprises a plasticizer.

16. The process of claim 15 wherein the plasticizer is glycerin.

17. The process of claim 11 wherein the adhesive is configured to adhere to at least polyethylene and paper.

* * * * *